(No Model.)

J. McDONALD.
BELT FASTENER.

No. 562,643. Patented June 23, 1896.

Witnesses
J. F. Coleman
E. A. Fincell

Inventor
James McDonald
by Wm. N. Fincell
his Atty.

UNITED STATES PATENT OFFICE.

JAMES McDONALD, OF GLOVERSVILLE, NEW YORK, ASSIGNOR OF ONE-HALF TO GEORGE F. TROUTWINE, OF SAME PLACE.

BELT-FASTENER.

SPECIFICATION forming part of Letters Patent No. 562,643, dated June 23, 1896.

Application filed March 26, 1896. Serial No. 584,963. (No model.)

*To all whom it may concern:*

Be it known that I, JAMES MCDONALD, a citizen of the United States, residing at Gloversville, in the county of Fulton and State of New York, have invented a certain new and useful Improvement in Belt-Fasteners, of which the following is a full, clear, and exact description.

The object of my invention is to provide a metallic fastener for belts which may be produced cheaply, applied quickly and economically, and be capable, in some instances, of ready removal and replacing for the purpose of taking up slack, my belt-fastener in all instances serving to unite the adjacent ends of a belt without buckling such ends, and also presenting a smooth and practically continuous surface next the pulley.

My invention comprehends a flat plate having integral hollow lugs which are adapted to enter holes made in the adjacent ends of the belt to receive bolts passed through the belt from its pulley side and through the hollow lugs and back plate and secured by nuts, a mid-rib projecting from the belt side of the back plate and adapted to stand between the adjacent ends of the plate in order to facilitate the alinement of the ends of the belt and to permit the application of the fastener to the belt without distortion of the ends of the belt, and hooks springing from the mid-rib and adapted to be bent down and sunk into the belt to afford additional security.

Figure 1:
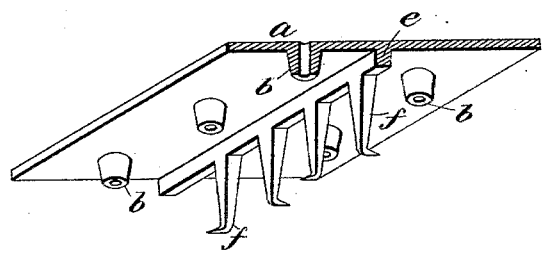
Figure 2:

In the accompanying drawings, illustrating my invention, in the several figures of which like parts are similarly designated, Figure 1 is a partly sectional perspective view, and Fig. 2 is a longitudinal section showing this fastener applied to the meeting ends of a belt.

The back plate $a$ may be a flat plate of metal, having integral therewith the projections $b$, extending from the belt side and made as hollow lugs, preferably constructed as truncated cones, that is to say, they are made tapering on the outside.

In the application of the fastener to the meeting ends of a belt, holes are punched in the belt to register with the projections on the back plate, and these projections or lugs are inserted in such holes, from the outside, and the plate and ends of the belt are united by means of flat-headed bolts $c$, pressed through from the pulley side of the belt and secured on the outside of the back plate by means of nuts $d$. The form of bolt shown is that commonly known as a "stove-bolt." The lugs reinforce the bolts against the lengthwise strain on the belt and serve to prevent the parting of the belt at the line of union.

In order to facilitate the proper alinement of the meeting ends of the belt, and incidentally to strengthen the back plate, I employ a mid-rib $e$, extending transversely of the back plate on its belt side. This mid-rib is of a height equal to, or substantially equal to, the thickness of the belt, and the adjacent ends of the belt are butted up against it, and their alinement thus quickly effected.

A further feature of my improvement, having for its object additional security, is shown as consisting of hooks $f$, which spring from the mid-rib $e$, and are adapted to be turned down over and their points inserted in the adjacent ends of the belt.

My fastener may be made of any suitable metal. I prefer to cast it of copper, brass, or malleable iron.

By the use of the hollow lugs, the strain of use is taken off the fastenings (screw-bolts) and imparted to the back plate, and thus is prevented the tearing out of the screws or fastenings from the plate, and the stretching or parting of the joint.

I am aware that is is old to use a back plate having hooks or prongs extending therefrom and adapted to be turned down upon and sunk into the belt, but in practice such a construction results in the tendency to drive apart and buckle the ends of the belt. By the use of the mid-rib and the hooks projecting from such mid-rib, this difficulty is overcome.

In my invention the pulley side of the belt is smooth or level, or substantially so, and without any buckle.

I have shown and described screw-bolts as the only medium for applying my fastener to the belt, and this is the preferred medium, inasmuch as it admits of the removal and the replacing of the fastener as occasion may require, but it is within my invention to use rivets or other permanent fastenings in place of the screw-bolts, especially in those instances where the capacity of removal and replacing is of no consequence.

What I claim is—

A belt-fastener, comprising a back plate having hollow lugs projecting from its belt side and adapted to enter holes in the adjacent ends of the belt and to receive fastening devices, such as screw-bolts, a mid-rib and hooks projecting from the said mid-rib and adapted to be turned down into the adjacent ends of the belt to which the fastener is applied, substantially as and for the purpose described.

In testimony whereof I have hereunto set my hand this 23d day of March, A. D. 1896.

JAMES McDONALD.

Witnesses:
JACOB H. KARKER,
WILLARD N. STEWART.